United States Patent
Albers et al.

(10) Patent No.: US 8,402,261 B2
(45) Date of Patent: Mar. 19, 2013

(54) SYSTEM AND METHOD PROVIDING A PLUGGABLE ARCHITECTURE FOR TASK MANAGEMENT ON COMPUTERS

(75) Inventors: Todd Thomas Albers, Santa Barbara, CA (US); James Martin Shaffer, Goleta, CA (US); Forest Rankin Carlisle, Ventura, CA (US)

(73) Assignee: CA, Inc., Islandia, NY (US)

(*) Notice: Subject to any disclaimer, the term of this patent is extended or adjusted under 35 U.S.C. 154(b) by 601 days.

(21) Appl. No.: 12/572,451

(22) Filed: Oct. 2, 2009

(65) Prior Publication Data

US 2011/0083002 A1    Apr. 7, 2011

(51) Int. Cl.
*G06F 9/00* (2006.01)
(52) U.S. Cl. ............... 713/2; 713/1; 713/100
(58) Field of Classification Search .......... 713/1, 2, 713/100
See application file for complete search history.

(56) References Cited

U.S. PATENT DOCUMENTS

| | | | |
|---|---|---|---|
| 2006/0253696 A1* | 11/2006 | Paul et al. | 713/2 |
| 2007/0186092 A1* | 8/2007 | Uemura et al. | 713/2 |
| 2009/0210691 A1* | 8/2009 | Im et al. | 713/2 |

* cited by examiner

*Primary Examiner* — Paul Yanchus, III
(74) *Attorney, Agent, or Firm* — Schwegman Lundberg & Woessner, P.A.

(57) ABSTRACT

A system and method retrieve an image using a first computer processor, and transmit the image from the first computer processor to a second remote computer processor. The first computer processor and the second remote computer processor are coupled via a network connection. The image is received at the network connection, and the image is a lightweight operating system that is configured to be stored in and execute in a virtual memory coupled to the second remote computer processor. The second remote computer processor is not equipped with additional hardware or an agent to receive or execute the image.

13 Claims, 4 Drawing Sheets

SYSTEM AND METHOD PROVIDING A PLUGGABLE ARCHITECTURE FOR TASK MANAGEMENT ON COMPUTERS

FIELD OF THE INVENTION

The present disclosure relates to a pluggable architecture for remote imaging, and in an embodiment, but not by way of limitation, a pluggable architecture for remote task management on a computer system.

BACKGROUND

United States Patent Publication No. 2003/0191911 to Kleinschnitz et al. relates to using disassociated images for computer and storage resource management. More specifically, Kleinschnitz relates to a system that uses a distinct management computer for managing storage, software, and other resources at another computer. The management computer of Kleinschnitz uses a disassociated ample image (from an original imaged computer) in its storage, and then deploys this image back to the original imaged computer. This permits the system of Kleinschnitz to work on that ample image while the ample image is still available for use on the original image computer, thereby putting backup copies of files to productive use rather than simply serving as a backup. Kleinschnitz further discloses the use of additional read only memory (ROM) to implement this system. Other systems similar to Kleinschnitz have used special agents to implement such functions.

The approaches described in this background section could be pursued, but are not necessarily approaches that have been previously conceived or pursued. Therefore, unless otherwise indicated herein, the approaches described in this background section are not prior art to the claims in this application and are not admitted to be prior art by inclusion in this background section.

DETAILED DESCRIPTION

Figure 1:
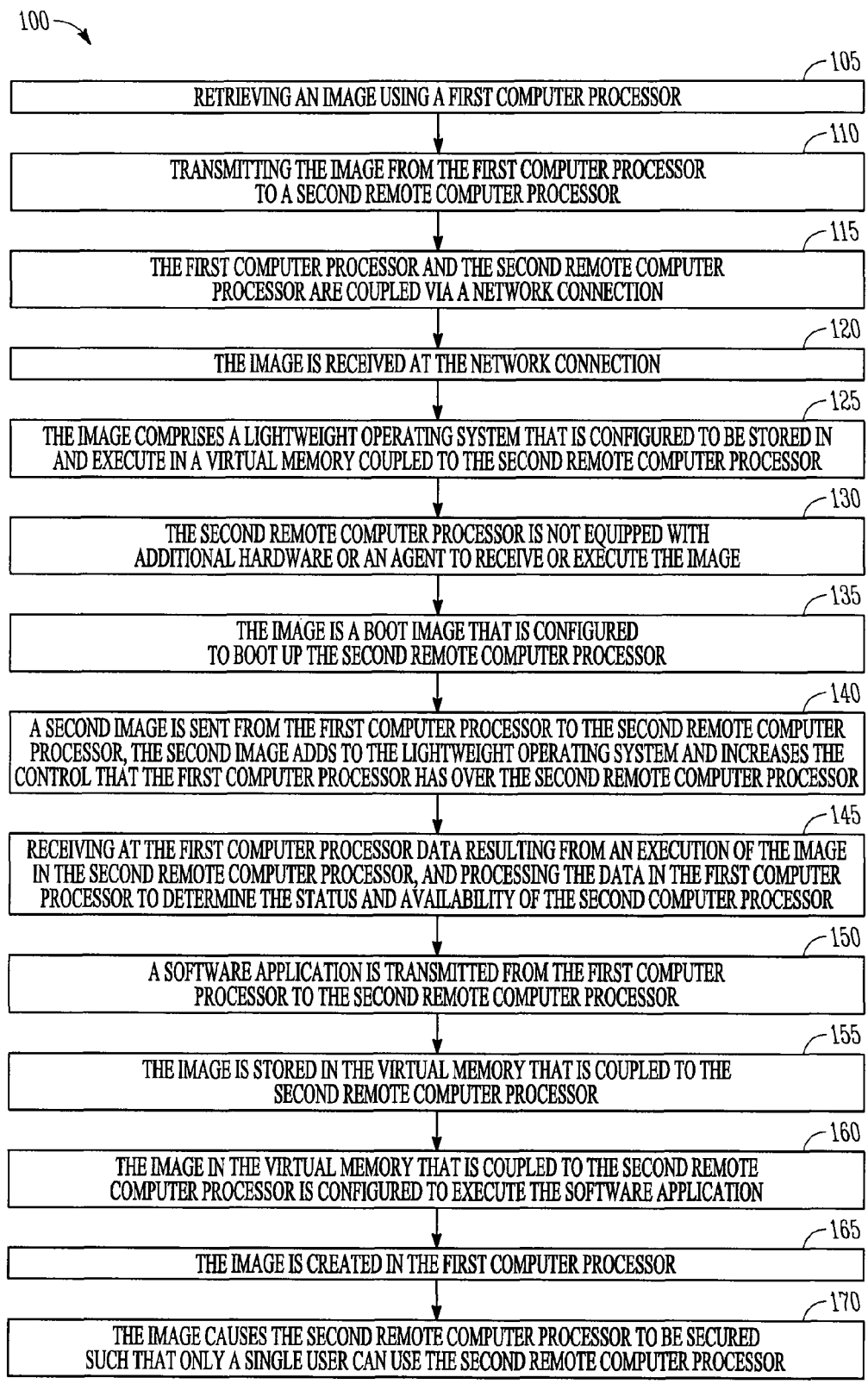
FIG. 1 is a flowchart of an example embodiment of a process to provide a pluggable architecture for task management on a computer system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

One or more embodiments of this disclosure relate to a system and method for providing a pluggable architecture for the execution and management of tasks on computers. Such embodiments permit a system manager or other user to determine the status and availability of computer resources. A system embodiment can provide a single source of information regarding who is using a system and the status of that system. An embodiment further can address problems of overlapping and competing work—that is, the situation can be avoided wherein work is destroyed because two different persons did not know that the other person was using the system or a file on the system.

In an embodiment, a command line imaging solution is used, which permits a user to avoid having to manually apply an image of a previously installed operating system. Rather, in this particular embodiment, a user can choose an image from a list, and the system then automatically carries out the steps in applying that image. In prior systems, a user would have to have physical access to a system, had to interact with the system throughout the process, and had to insure that all steps were followed.

Additionally, an embodiment provides a facility for creating and/or storing an image. This allows a user to save or store a currently configured image for later use. Without this facility or ability, a user would essentially have to manually store an image.

The embodiments disclosed herein then provide a wide variety of functionalities. Each functionality provides an intrinsic value which is then enhanced. One or more embodiments could be used for or in conjunction with installing applications after an image has been applied, running automatic processes, and deploying production servers.

One embodiment includes three primary parts. First, a management console is used to send tasks to a particular machine. The console could involve a web interface. Second, a server is used to send a task execution image to the machine. In a particular embodiment, the server is a Pre-Boot Execution (PXE) server or a Trivial File Transfer Protocol (TFTP) server. When the particular machine has a task sent to it, the machine is rebooted and boots up into the server, and in a particular embodiment, the PXE/TFTP server. Third, a special image is sent to the machine. When this special image boots up, it reads a configuration file (using a media access control (MAC) address and a key/id) to find the task that it is supposed to execute. Then, the MAC address is used throughout the process so that the machine knows how to find information about itself in the configuration files. This embodiment provides ease in setting up the environment and ease in managing the application. This and other embodiments can be used for locking a machine so that only one user can use the machine, and also used for sending images to machines.

FIG. 1 is a flowchart of an example embodiment of a process 100 to provide a pluggable architecture for task management on a computer system. FIG. 1 includes a number of process blocks 105-170. Though arranged serially in the example embodiment of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 1, the process 100 includes at 105 retrieving an image using a first computer processor, and at 110, transmitting the image from the first computer processor to a second remote computer processor. At 115, the first computer processor and the second remote computer processor are coupled via a network connection, at 120, the image is received at the network connection, at 125, the image comprises a lightweight operating system that is configured to be stored in and execute in a virtual memory coupled to the second remote computer processor, and at 130, the second remote computer processor is not equipped with additional hardware or an agent to receive or execute the image. In the embodiment disclosed at 135, the image is a boot image that is configured to boot up the second remote computer processor.

At 140, the process 100 further includes sending a second image from the first computer processor to the second remote computer processor. In the execution of step 140, the second image adds to the lightweight operating system and increases the control that the first computer processor has over the second remote computer processor.

At 145, the process 100 further includes receiving at the first computer processor data resulting from an execution of the image in the second remote computer processor, and processing the data in the first computer processor to determine the status and availability of the second computer processor.

At 150, the process 100 further includes transmitting a software application from the first computer processor to the second remote computer processor. At 155, the image is stored in the virtual memory that is coupled to the second remote computer processor, and at 160, the image in the virtual memory that is coupled to the second remote computer processor is configured to execute the software application. At 165, the image is created in the first computer processor. At 170, the image causes the second remote computer processor to be secured such that only a single user can use the second remote computer processor.

Figure 2:
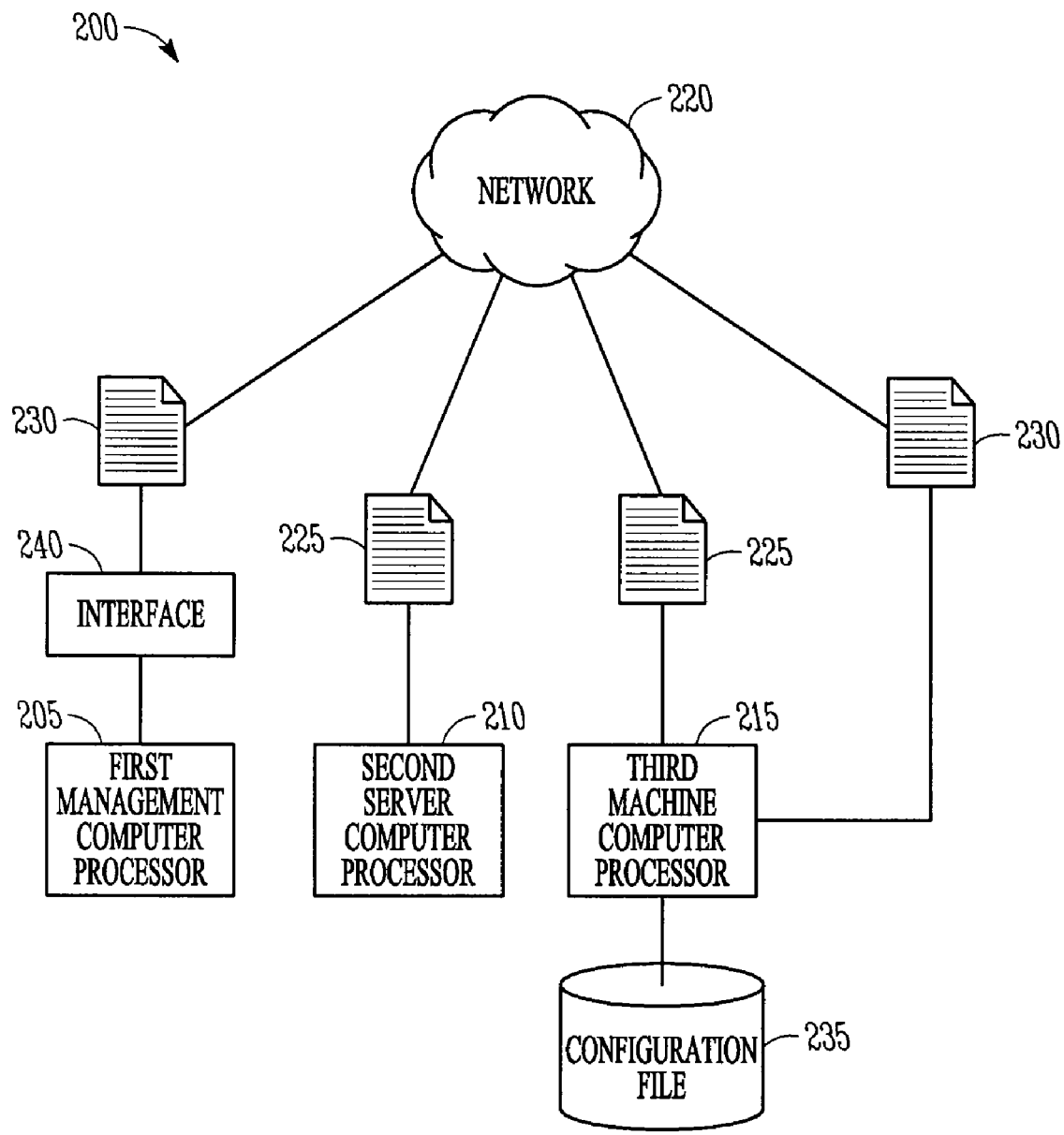
FIG. 2 is a block diagram of an example system employing a pluggable architecture for task management on a computer system.

FIG. 2 is a block diagram of an example system 200 employing a pluggable architecture for task management on a computer system. The system includes a first management computer processor 205, a second server computer processor 210, and a third machine computer processor 215. The first management computer processor 205, the second server computer processor 210, and the third machine computer processor 215 are linked together via a network 220. In an embodiment, the first management computer processor 205 is configured to cause the second server computer processor 210 to transmit a first image 225 to the third machine computer processor 215. The first image 225 causes the third machine computer processor 215 to boot up in the second server computer processor 210. As illustrated in FIG. 2, the first management computer processor 205 is configured to transmit a second image 230 to the third machine computer processor 215. When the second image 230 boots up in the third machine computer processor 215, the second image 230 reads a configuration file 235 to locate a task to execute.

FIG. 2 further illustrates that the system 200 includes an interface 240 between the first management computer processor 205 and the network 220. The interface can be a web interface to the Internet. In an embodiment, the first management computer processor 205 is a Pre-Boot Execution Environment (PXE) server or a Trivial File Transfer Protocol (TFTP) server. In another embodiment, the second image 230 is configured to execute a script file or command file on the second computer server processor 210 or the third machine computer processor 215. In this embodiment, the second image 230 locates the configuration file 235 using a MAC address and a key for the task. The second image 230 can also be configured to lock out the third machine computer processor 215 such that only a single user can use the third machine computer processor 215.

Figure 3:
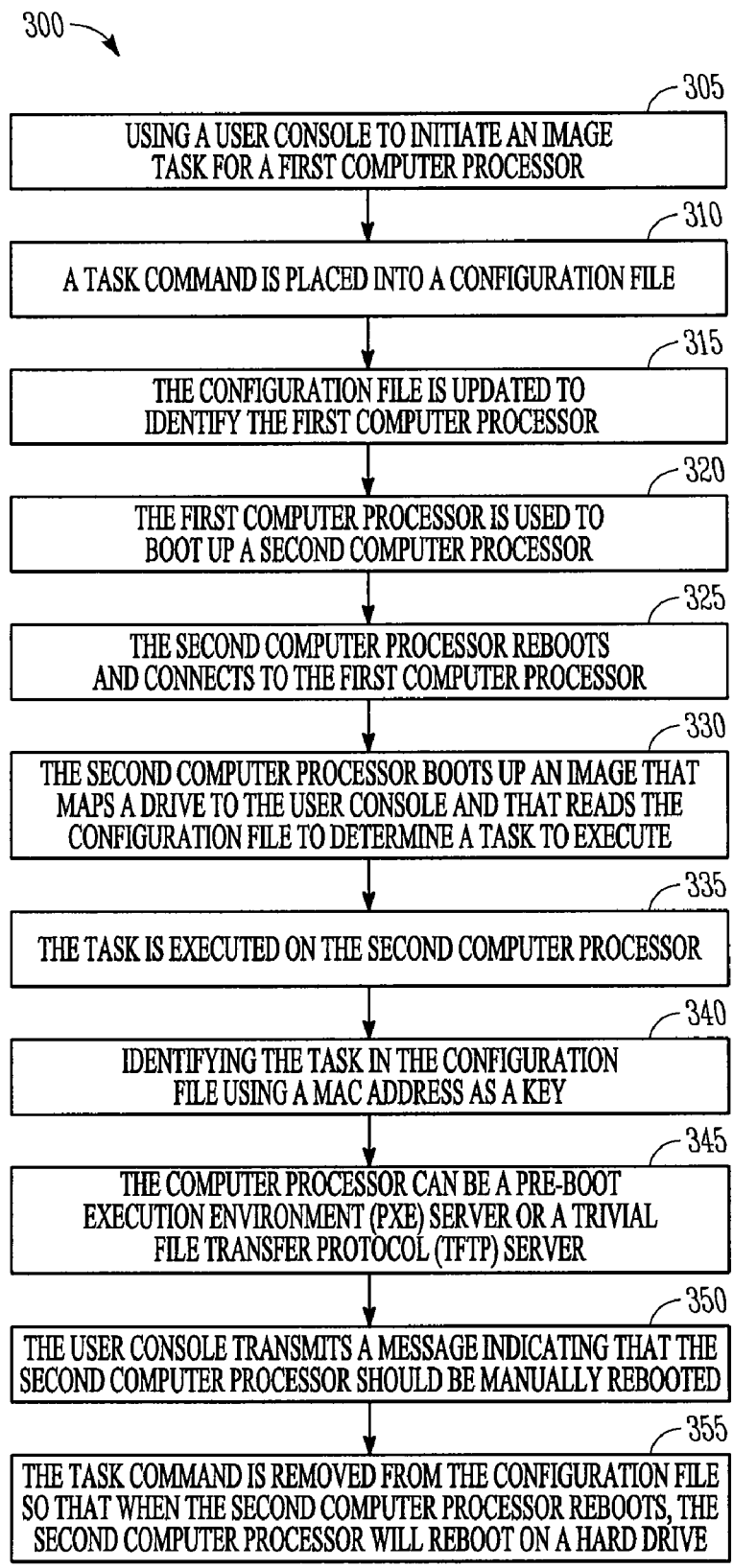
FIG. 3 is a flowchart of another example embodiment of a process to provide a pluggable architecture for task management of a computer system.

FIG. 3 is a flowchart of another example embodiment of a process 300 to provide a pluggable architecture for task management on a computer system. FIG. 3 includes a number of process blocks 305-355. Though arranged serially in the example embodiment of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 3, the process 300 includes at 305 using a user console to initiate an image task for a first computer processor. At 310, a task command is placed into a configuration file. At 315, the configuration file is updated to identify the first computer processor. At 320, the first computer processor is used to boot up a second computer processor. At 325, the second computer processor reboots and connects to the first computer processor. At 330, the second computer processor boots up an image that maps a drive to the user console and that reads the configuration file to determine a task to execute. At 335, the task is executed on the second computer processor.

The process 300 of FIG. 3 further includes at 340 identifying the task in the configuration file using a MAC address as a key. It is noted at 345 that the computer processor can be a Pre-Boot Execution Environment (PXE) server or a Trivial File Transfer Protocol (TFTP) server. At 350, the user console transmits a message indicating that the second computer processor should be manually rebooted. At 355, the task command is removed from the configuration file so that when the second computer processor reboots, the second computer processor will reboot on a hard drive.

Figure 4:
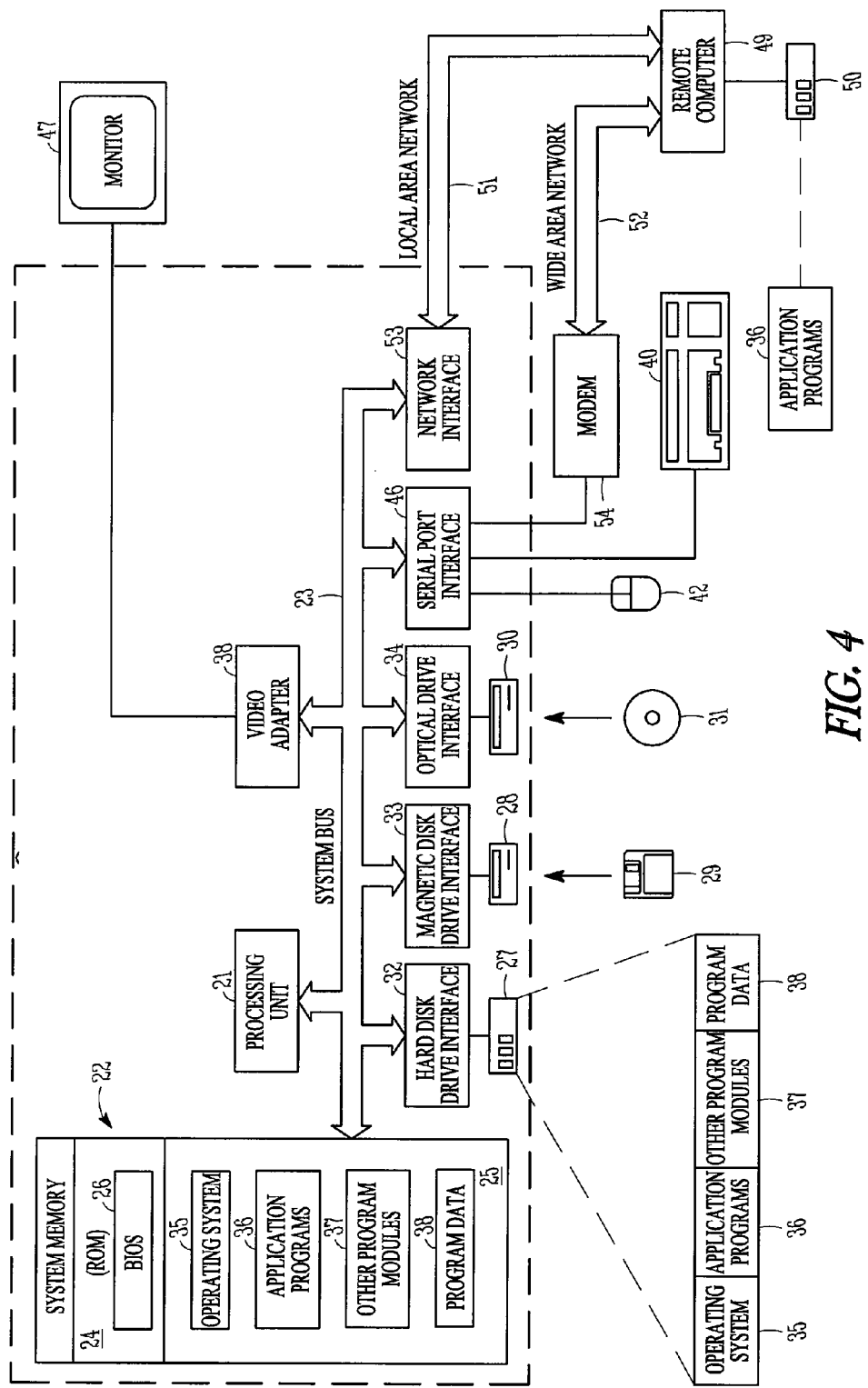
FIG. 4 is a block diagram of another example embodiment of a system upon which a pluggable architecture for task management on a computer system can operate.

FIG. 4 is an overview diagram of a hardware and operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

As noted above, the self learning and recovery backup management system as disclosed herein can be spread across many physical hosts. Therefore, many systems and sub-systems of FIG. 4 can be involved in such a backup and recovery management system.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the interne, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for providing a pluggable architecture for task management on computers have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A process comprising:
   retrieving an image using a first computer processor;
   transmitting the image from the first computer processor to a second remote computer processor; and
   sending a second image from the first computer processor to the second remote computer processor;
   wherein the second image adds to the lightweight operating system and increases the control that the first computer processor has over the second remote computer processor;
   wherein the first computer processor and the second remote computer processor are coupled via a network connection;
   wherein the image is received at the network connection;
   wherein the image comprises a lightweight operating system that is configured to be stored in and execute in a virtual memory coupled to the second remote computer processor; and
   wherein the second remote computer processor is not equipped with additional hardware or an agent to receive or execute the image.

2. The process of claim 1, wherein the image is a boot image that is configured to boot up the second remote computer processor.

3. The process of claim 1, comprising:
   receiving at the first computer processor data resulting from an execution of the image in the second remote computer processor; and
   processing the data in the first computer processor to determine the status and availability of the second computer processor.

4. The process of claim 1, comprising:
   transmitting a software application from the first computer processor to the second remote computer processor; and
   storing the image in the virtual memory that is coupled to the second remote computer processor;
   wherein the image in the virtual memory that is coupled to the second remote computer processor is configured to execute the software application.

5. The process of claim 1, comprising creating the image in the first computer processor.

6. The process of claim 1, wherein the image causes the second remote computer processor to be secured such that only a single user can use the second remote computer processor.

7. A process comprising:
   receiving at a second remote computer processor an image from a first computer processor;
   receiving at the second remote computer processor a second image from the first computer processor;
   wherein the second image adds to the lightweight operating system and increases the control that the first computer processor has over the second remote computer processor;
   wherein the first computer processor and the second remote computer processor are coupled via a network connection;
   wherein the image is received at the network connection;
   wherein the image comprises a lightweight operating system that is configured to be stored in and execute in a virtual memory coupled to the second remote computer processor; and wherein the second remote computer processor is not equipped with additional hardware or an agent to receive or execute the image.

8. A system comprising:

a first computer processor and a second remote computer processor;

wherein the first computer processor is operable to retrieve an image;

wherein the first computer processor is operable to transmit the image to the second remote computer processor;

wherein the first computer processor is operable to send a second image to the second remote computer processor;

wherein the second image adds to the lightweight operating system and increases the control that the first computer processor has over the second remote computer processor;

wherein the first computer processor and the second remote computer processor are coupled via a network connection;

wherein the image is received at the network connection;

wherein the image comprises a lightweight operating system that is configured to be stored in and execute in a virtual memory coupled to the second remote computer processor; and wherein the second remote computer processor is not equipped with additional hardware or an agent to receive or execute the image.

9. The system of claim 8, wherein the image is a boot image that is configured to boot up the second remote computer processor.

10. The system of claim 8, wherein the first computer processor is operable to:

receive data resulting from an execution of the image in the second remote computer processor; and process the data to determine the status and availability of the second remote computer processor.

11. The system of claim 8, wherein the first computer processor is operable to:

transmit a software application to the second remote computer processor; and store the image in virtual memory that is coupled to the second remote computer processor;

wherein the image in the virtual memory that is coupled to the second remote computer processor is configured to execute the software application.

12. The system of claim 8, wherein the first computer processor is configured to create the image.

13. The system of claim 8, wherein the image causes the second remote computer processor to be secured such that only a single user can use the second remote computer processor.

* * * * *